(12) United States Patent
Li et al.

(10) Patent No.: US 12,547,065 B2
(45) Date of Patent: Feb. 10, 2026

(54) HOLOGRAM PROJECTION SYSTEM FOR VEHICLE AND VEHICLE INCLUDING THE SAME

(71) Applicants: Hyundai Motor Company, Seoul (KR); Kia Corporation, Seoul (KR)

(72) Inventors: Zhe Li, Yantai (CN); Xiao He, Yantai (CN); Yan Xiang Huang, Yantai (CN); In Sik Chun, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 305 days.

(21) Appl. No.: 18/539,923

(22) Filed: Dec. 14, 2023

(65) Prior Publication Data

US 2024/0295806 A1 Sep. 5, 2024

(30) Foreign Application Priority Data

Mar. 2, 2023 (CN) .......................... 202310227334.1

(51) Int. Cl.
| | | |
|---|---|---|
| *G03B 21/608* | (2014.01) | |
| *B60Q 3/50* | (2017.01) | |
| *B60Q 3/60* | (2017.01) | |
| *B60Q 3/70* | (2017.01) | |
| *B60Q 3/80* | (2017.01) | |
| *G03B 21/14* | (2006.01) | |

(52) U.S. Cl.
CPC ............ *G03B 21/608* (2013.01); *B60Q 3/50* (2017.02); *B60Q 3/60* (2017.02); *B60Q 3/70* (2017.02); *B60Q 3/80* (2017.02); *G03B 21/145* (2013.01)

(58) Field of Classification Search
CPC ... B60Q 3/50; B60Q 3/60; B60Q 3/70; B60Q 3/80
See application file for complete search history.

(56) References Cited

U.S. PATENT DOCUMENTS

| | | | | |
|---|---|---|---|---|
| 7,068,789 B2 * | 6/2006 | Huitema | ............. | H04L 63/1458 |
| | | | | 713/168 |
| 7,402,743 B2 * | 7/2008 | Clark | ................... | G10H 1/0008 |
| | | | | 250/206 |

(Continued)

FOREIGN PATENT DOCUMENTS

CN 212499804 U 2/2021

*Primary Examiner* — Michael B. Pierorazio
(74) *Attorney, Agent, or Firm* — MORGAN, LEWIS & BOCKIUS LLP

(57) ABSTRACT

A hologram projection system for a vehicle includes a controller, a housing including a plurality of through-holes formed in an upper surface of the housing, a casing used to store water, a sprayer mounted in the housing, fluidly connected to the casing, including a plurality of nozzles protruding through the through-holes in the upper surface of the housing, electrically connected to the controller, configured to spray water in the casing as water mist by performing a spray operation under a control of the controller, and configured to spray the water mist, and a hologram projection device provided in the housing, electrically connected to the controller, and including a light-emitting device mounted on the upper surface of the housing, in which the hologram projection device is configured to generate different beams under control of the controller and to form different patterns by projecting the different beams to the water mist.

19 Claims, 12 Drawing Sheets

(56) References Cited

U.S. PATENT DOCUMENTS

| | | | | |
|---|---|---|---|---|
| 7,614,069 B2* | 11/2009 | Stone | H04N 21/25435 | 725/89 |
| 7,650,624 B2* | 1/2010 | Barsoum | H04N 7/081 | 725/23 |
| 7,721,313 B2* | 5/2010 | Barrett | H04N 21/4334 | 725/89 |
| 7,813,822 B1* | 10/2010 | Hoffberg | H04N 7/163 | 381/73.1 |
| 8,032,911 B2* | 10/2011 | Ohkita | H04L 61/5038 | 725/74 |
| 8,121,706 B2* | 2/2012 | Morikawa | H04L 12/2814 | 725/74 |
| 8,949,923 B2* | 2/2015 | Muvavarirwa | H04N 21/4108 | 370/332 |
| 9,869,438 B2* | 1/2018 | Zawacki | G03B 29/00 | |
| 10,107,469 B2* | 10/2018 | Nakazawa | F21S 41/663 | |
| 10,197,971 B1* | 2/2019 | Horst | G11C 13/044 | |
| 10,838,117 B2* | 11/2020 | Hohmann | F21S 43/00 | |
| 11,872,572 B2* | 1/2024 | Fuller | B05B 17/08 | |
| 2003/0056093 A1* | 3/2003 | Huitema | H04L 67/104 | 713/156 |
| 2004/0117856 A1* | 6/2004 | Barsoum | G06Q 30/0207 | 348/E7.071 |
| 2005/0216942 A1* | 9/2005 | Barton | H04N 21/6125 | 348/E7.071 |
| 2005/0283815 A1* | 12/2005 | Brooks | H04H 20/78 | 725/127 |
| 2005/0289632 A1* | 12/2005 | Brooks | H04N 7/17309 | 725/127 |
| 2006/0010481 A1* | 1/2006 | Wall | H04N 7/163 | 725/151 |
| 2006/0212197 A1* | 9/2006 | Butler | B60R 11/0235 | 701/1 |
| 2006/0225105 A1* | 10/2006 | Russ | H04N 7/17318 | 348/E7.071 |
| 2007/0050822 A1* | 3/2007 | Stevens | H04N 7/14 | 725/74 |
| 2007/0079341 A1* | 4/2007 | Russ | H04N 21/43615 | 725/89 |
| 2007/0101185 A1* | 5/2007 | Ostrowka | H04N 21/4334 | 714/6.13 |
| 2007/0130601 A1* | 6/2007 | Li | H04N 21/6405 | 725/112 |
| 2007/0157281 A1* | 7/2007 | Ellis | H04N 21/4147 | 725/74 |
| 2008/0013919 A1* | 1/2008 | Boston | G11B 19/00 | |
| 2008/0022330 A1* | 1/2008 | Barrett | H04N 21/8352 | 725/89 |
| 2008/0022331 A1* | 1/2008 | Barrett | H04N 21/6125 | 725/89 |
| 2008/0022332 A1* | 1/2008 | Barrett | H04N 21/4227 | 725/89 |
| 2008/0155615 A1* | 6/2008 | Craner | H04N 7/17318 | 348/E7.071 |
| 2008/0221734 A1* | 9/2008 | Nagao | G06V 10/56 | 706/20 |
| 2008/0235587 A1* | 9/2008 | Heie | H04N 7/142 | 709/231 |
| 2008/0235733 A1* | 9/2008 | Heie | H04N 21/482 | 725/46 |
| 2009/0162032 A1* | 6/2009 | Patel | H04N 21/8355 | 386/353 |
| 2010/0107186 A1* | 4/2010 | Varriale | H04H 60/23 | 455/410 |
| 2010/0125876 A1* | 5/2010 | Craner | H04N 21/4331 | 725/37 |
| 2010/0263013 A1* | 10/2010 | Asakura | H04N 21/443 | 725/116 |
| 2010/0296487 A1* | 11/2010 | Karaoguz | H04W 36/04 | 370/332 |
| 2010/0313225 A1* | 12/2010 | Cholas | H04N 21/4402 | 725/62 |
| 2010/0313226 A1* | 12/2010 | Cholas | H04N 21/25875 | 725/98 |
| 2011/0066744 A1* | 3/2011 | Del Sordo | H04N 21/4305 | 709/231 |
| 2011/0086619 A1* | 4/2011 | George | H04M 1/72415 | 455/414.1 |
| 2011/0103374 A1* | 5/2011 | Lajoie | H04L 65/612 | 370/352 |
| 2011/0107364 A1* | 5/2011 | Lajoie | H04L 65/1023 | 370/352 |
| 2011/0107379 A1* | 5/2011 | Lajoie | H04L 65/611 | 725/151 |
| 2011/0191810 A1* | 8/2011 | Thomas | H04N 7/106 | 725/78 |
| 2012/0230649 A1* | 9/2012 | Craner | H04N 21/4532 | 386/230 |
| 2013/0198787 A1* | 8/2013 | Perry, II | H04N 21/2585 | 725/86 |
| 2014/0239086 A1* | 8/2014 | Wong | B05B 17/08 | 239/18 |
| 2014/0362347 A1* | 12/2014 | Oel | B60K 37/20 | 353/13 |
| 2017/0109584 A1* | 4/2017 | Yao | H04N 21/4666 | |
| 2017/0254932 A1* | 9/2017 | Huang | G02F 1/21 | |
| 2018/0150704 A1* | 5/2018 | Lee | G06V 10/82 | |
| 2019/0071001 A1* | 3/2019 | Ahn | B60Q 1/302 | |
| 2019/0072254 A1* | 3/2019 | Ahn | F21S 43/315 | |
| 2019/0108618 A1* | 4/2019 | Hwang | G06N 3/0464 | |
| 2019/0222891 A1* | 7/2019 | Shen | H04N 21/25875 | |
| 2020/0173625 A1* | 6/2020 | Meier | B60R 11/04 | |
| 2020/0196024 A1* | 6/2020 | Hwang | G06N 3/044 | |
| 2020/0211229 A1* | 7/2020 | Hwang | G06T 3/06 | |
| 2021/0072628 A1* | 3/2021 | Hattori | F21S 43/26 | |
| 2021/0162916 A1* | 6/2021 | Ikenouchi | B60Q 1/143 | |
| 2021/0326690 A1* | 10/2021 | Pégard | G06V 10/88 | |
| 2023/0043791 A1* | 2/2023 | Supikov | G03H 1/0866 | |
| 2023/0205133 A1* | 6/2023 | Matusik | G03H 1/04 | 359/9 |
| 2023/0368012 A1* | 11/2023 | Yu | G02B 5/18 | |

\* cited by examiner

HOLOGRAM PROJECTION SYSTEM FOR VEHICLE AND VEHICLE INCLUDING THE SAME

CROSS-REFERENCE TO RELATED APPLICATION

The present application claims priority to Chinese Patent Application No. 202310227334.1 filed in the Chinese National Intellectual Property Administration on Mar. 2, 2023, the entire contents of which is incorporated herein for all purposes by this reference.

BACKGROUND OF THE PRESENT DISCLOSURE

Field of the Present Disclosure

The present disclosure relates to a vehicle field, and more particularly, to a hologram projection system for a vehicle and a vehicle including the same.

Description of Related Art

An internal environment of a vehicle is directly related to quality and luxurious usability of the vehicle.

Vehicle manufactures add some functions in the vehicle to improve comfort and luxurious feel of the interior of the vehicle. For example, a technology for adding a driver monitoring system, a mood lighting, a humidifier, and a scenting device in the vehicle is generally known.

However, there are still no vehicles into which a hologram projection technology is applied.

The information included in this Background in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hologram projection system for a vehicle and a vehicle including the same. The hologram projection system includes a hologram projection device and a sprayer provided in the vehicle. The hologram projection device forms different patterns by projecting different beams to water mist formed by the sprayer, implementing a hologram projection in the vehicle.

A first aspect of the present disclosure provides a hologram projection system for a vehicle. The hologram projection system includes: a controller: a housing including a plurality of through-holes formed in an upper surface of the housing: a casing storing water and integrally connected to the housing: a sprayer mounted in the housing, fluidly connected to the casing, including a plurality of nozzles protruding through the through-holes in the upper surface of the housing, electrically connected to the controller, configured to spray water in the casing as water mist by performing a spray operation under a control of the controller, and configured to spray the water mist toward a location above the housing through the nozzles; and a hologram projection device provided in the housing, electrically connected to the controller, and including a light-emitting device mounted on the upper surface of the housing, in which the hologram projection device is configured to generate different beams under control of the controller and to form different patterns by projecting the different beams to the water mist formed above the housing by the light-emitting device.

The plurality of nozzles of the sprayer may be provided in a circumferential direction around the light-emitting device.

The nozzles may each be directed upward in a vertical direction or inclined at a predetermined angle with respect to the vertical direction under the control of the controller.

The nozzles may each be inclined at the predetermined angle toward a front side of the vehicle with respect to the vertical direction, and a range of the predetermined angle is 0 to 10 degrees.

The controller may be configured to: obtain operating states of the hologram projection device and the sprayer: obtain a hologram projection theme selected by a user in response to operations of the hologram projection device and the sprayer; and transmit a first instruction in accordance with the hologram projection theme selected by the user, to the hologram projection device, and the first instruction may be provided to control the hologram projection device to project the different beams to the water mist and form a pattern corresponding to the selected hologram projection theme in the water mist.

The hologram projection theme may include a music rhythm, a moonlight dance, a natural image, and a vehicle speed.

The controller may be further configured to: obtain a ratio between a height of an opening defined above a glass and a height of a vehicle window; and transmit a second instruction in response to the ratio exceeding a predetermined value, and the second instruction may be provided to control and raise the glass of the vehicle window until the ratio becomes equal to the predetermined value and to control the nozzles of the sprayer so that at least one nozzle of the nozzles is inclined toward a front side of the vehicle.

The controller may be further configured to: obtain an operating mode of an air conditioner of the vehicle; and transmit a third instruction to the air conditioner in response to the air conditioner being in a face direction blowing mode, and the third instruction may be provided to control the air conditioner to switch a mode to a foot direction blowing mode of the air conditioner.

The controller may be further configured to: obtain a vehicle speed, a state of a parking brake, and a state of a door lock in response to a door opening warning mode being selected; and transmit a fourth instruction to the hologram projection device in response to the vehicle speed being 0, the parking brake being in a parking state, and the door lock being in a released state, and the fourth instruction may be provided to control the hologram projection device to project warning beams to the water mist. The warning beams are provided to warn a driver and a passenger to pay attention to passing vehicles and pedestrians.

A second aspect of the present disclosure provides a vehicle including the hologram projection system for a vehicle according to the first aspect.

The hologram projection system for a vehicle of the present disclosure includes the hologram projection device and the sprayer integrated with the interior of the vehicle, and the hologram projection device forms different patterns by projecting the different beams to the water mist formed by the sprayer, implementing the hologram projection in the vehicle.

The device according to an exemplary embodiment of the present disclosure may have other features and advantages, and these features and advantages will become clear from the accompanying drawings and the following embodiments or described in detail with reference to the accompanying drawings and the following embodiments. These drawings and embodiments are all intended to interpret the predetermined principles of the present disclosure.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
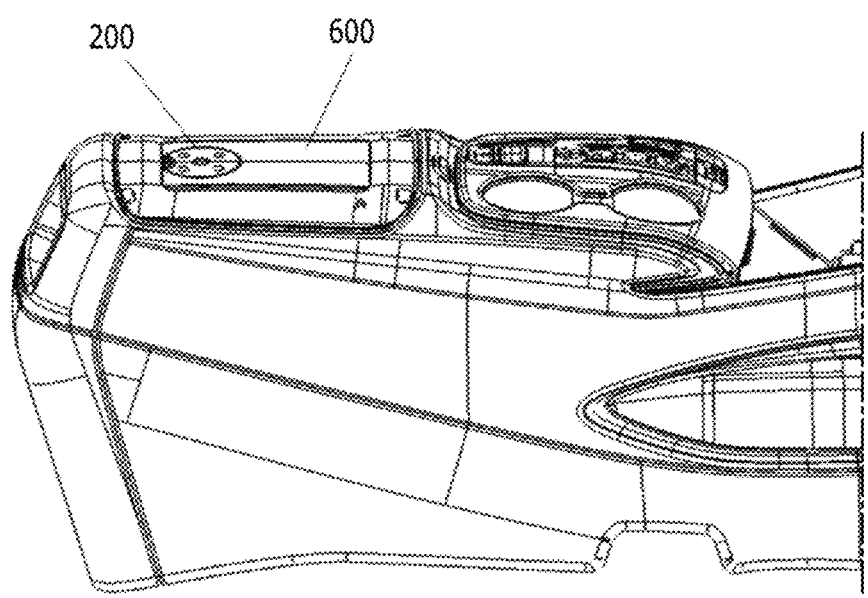
FIG. 1 is a schematic view of a hologram projection system for a vehicle mounted on a console box portion according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a hologram projection system for a vehicle according to an exemplary embodiment of the present disclosure will be described with reference to FIG. 1, FIG. 2, FIG. 3, FIG. 4, FIG. 5, FIG. 6, FIG. 7, FIG. 8, FIG. 9, FIG. 10, FIG. 11 and FIG. 12.

With reference to FIG. 1, FIG. 2, FIG. 3, FIG. 4, and FIG. 5, a hologram projection system for a vehicle of an exemplary embodiment of the present disclosure includes a controller 100, a housing 200, a casing 300, a sprayer 400, and a hologram projection device 500.

The controller 100 may be manufactured separately from an in-vehicle PC and mounted in a vehicle body, or the controller 100 may be integrated with the in-vehicle PC.

Figure 4:
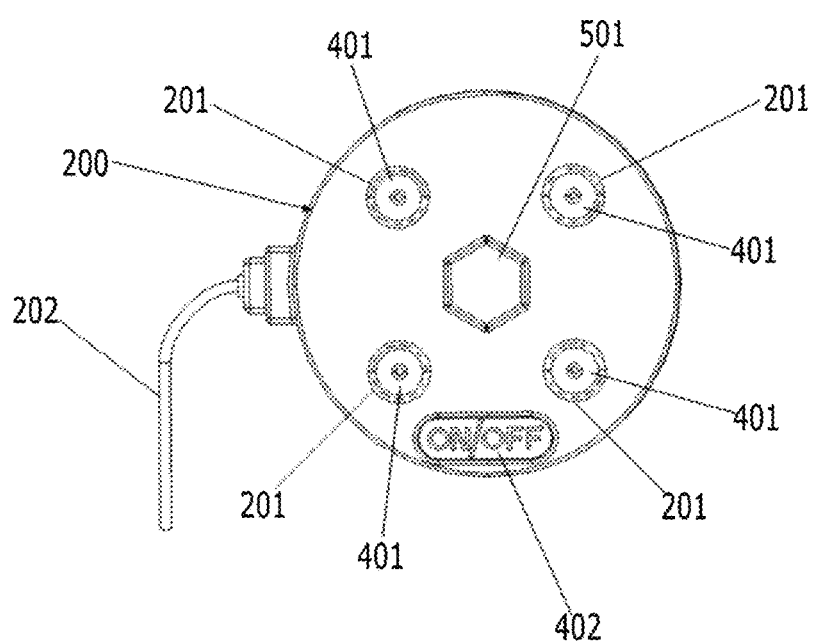
FIG. 4 is a top plan view of a housing.

With reference to FIG. 4, a plurality of through-holes 201 is provided in an upper surface of the housing 200.

Figure 2:
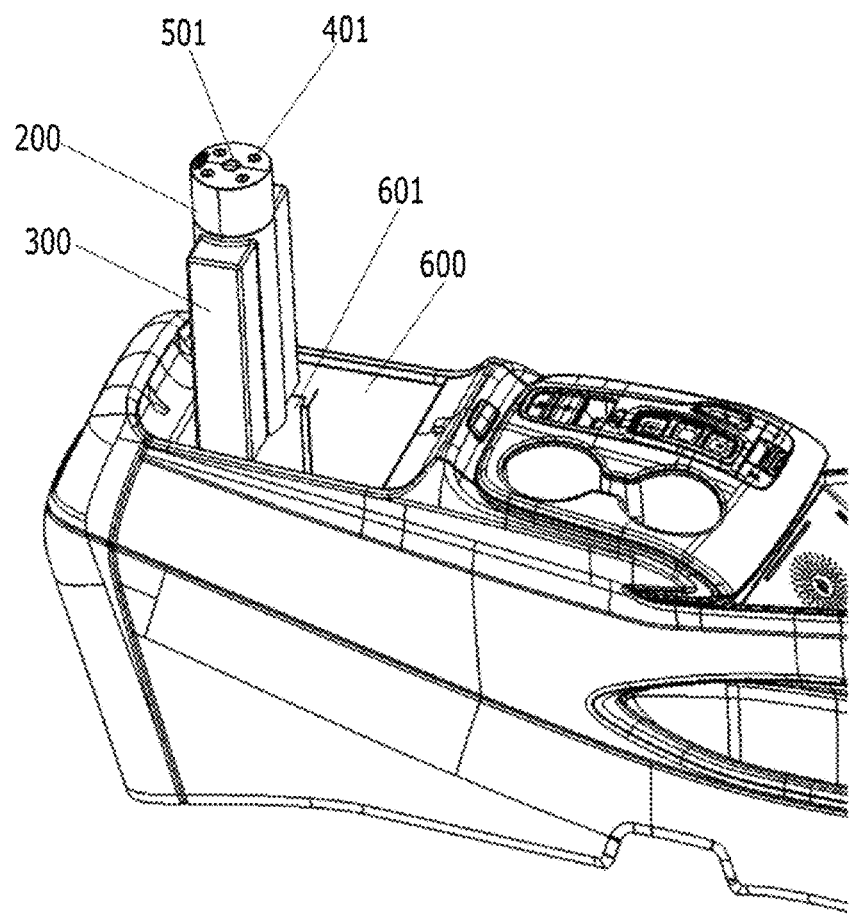
FIG. 2 is a schematic view exemplarily illustrating a state in which a housing and a casing are extended from the console box portion in FIG. 1.
Figure 5:
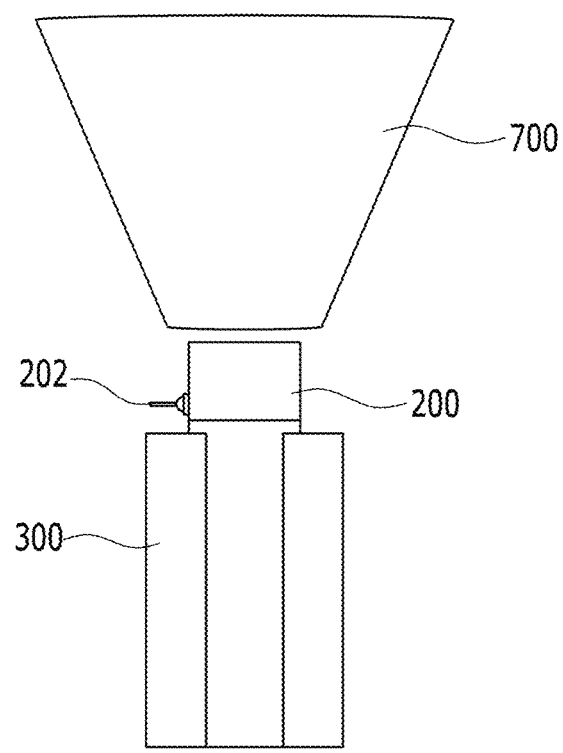
FIG. 5 is a schematic view exemplarily illustrating positions of a housing, a casing, and water mist.

With reference to FIGS. 2 and 5, the casing 300 is used to store water therein. The casing 300 may be integrally connected to the housing 200 and mounted below the housing 200. With reference to FIG. 1, the housing 200 and the casing 300 are mounted on a console box 600 disposed between a driver seat and a passenger seat, with reference to FIG. 2, a mounting groove 601 is recessed downwardly in an upper surface of the console box 600, and the housing 200 and the casing 300 is mounted in the mounting groove 601 so that the upper surface of the housing 200 is aligned with the console box 600. As illustrated in FIG. 1, the casing 300 is hidden in the mounting groove 601 in a state in which the housing 200 and the casing 300 are accommodated. Therefore, spatial utilization of the interior of the vehicle is improved.

Figure 3:
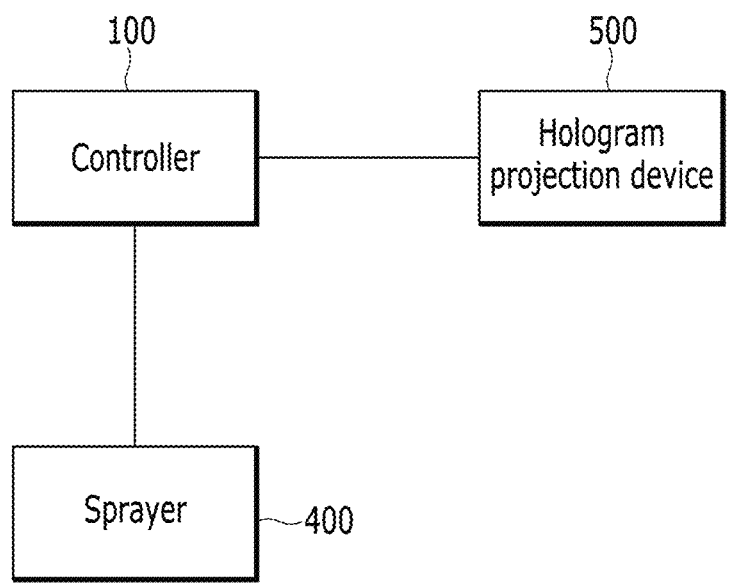
FIG. 3 is a schematic view exemplarily illustrating connection between constituent elements of a hologram projection system for a vehicle according to an exemplary embodiment of the present disclosure.

The sprayer 400 is mounted in the housing 200 and fluidly connected to the casing 300. With reference to FIG. 4, the sprayer 400 includes a plurality of nozzles 401, and the plurality of nozzles 401 protrudes from the through-holes 201 in the upper surface of the housing 200. With reference to FIG. 3, an actuator of the sprayer 400 is electrically connected to the controller 100 and configured to spray water in the casing 300 as water mist by performing a spray operation under control of the controller 100. With reference to FIG. 4 and FIG. 5, the sprayer 400 sprays water mist 700 toward a location above the housing 200 through the nozzles 401. A cable assembly 202 is mounted in the housing 200, and the actuator of the sprayer 400 is electrically connected to the controller 100 through the cable assembly 202 and receive a corresponding control signal from the controller 100. The sprayer 400 is configured to perform the spray operation in response to the corresponding control signal. The cable assembly 202 may include a plurality of cables, and the actuator of the sprayer 400 may be electrically connected to the controller 100 through some of the cables of the cable assembly 202.

The hologram projection device 500 is provided in the housing 200 and electrically connected to the controller 100. With reference to FIG. 4, the hologram projection device 500 includes a light-emitting device 501 protruding from the upper surface of the housing 200. The hologram projection device 500 further includes a circuit board mounted in the housing 200. The circuit board is electrically connected to the light-emitting device 501. The circuit board is electrically connected to the controller 100 through some of the remaining cables of the cable assembly 202.

The hologram projection device 500 may be configured to generate different beams under the control of the controller 100 and generate different patterns by projecting the different beams to the water mist disposed above the housing 200 through the light-emitting device 501. The circuit board of the hologram projection device 500 may obtain the corresponding control signal generated by the controller 100 through the cable assembly 202 and control the light-emitting device 501 to generate the corresponding beams in response to the corresponding control signal.

According to the exemplary embodiment of the present disclosure, the hologram projection device 500 and the sprayer 400 are integrated with the interior of the vehicle, and the hologram projection device 500 forms the different patterns by projecting the different beams to the water mist formed by the sprayer 400, implementing a hologram projection in the vehicle.

In an exemplary embodiment of the present disclosure, with reference to FIG. 4, a control switch 402 is mounted on the sprayer 400. The control switch 402 may be mounted on the upper surface of the housing 200 and allow a user to easily control an ON/OFF of the sprayer 400. Therefore, the user may easily control the sprayer 400 to provide a medium for the beams of the hologram projection device 500.

In the exemplary embodiment in FIG. 2, it is exemplified that the casing 300 is mounted below the housing 200. However, a position of the casing 300 is not limited to the exemplary embodiment in FIG. 2. The casing 300 may be disposed on a lateral surface of the housing 200.

In an exemplary embodiment of the present disclosure, with reference to FIG. 4 and FIG. 5, the plurality of nozzles 401 of the sprayer 400 is provided in a circumferential direction around the light-emitting device 501 and distributed at equal intervals so that a shape of the water mist 700 formed above the housing 200 is approximately conical.

In an exemplary embodiment of the present disclosure, with reference to FIG. 4, four nozzles 401 are provided in a circumferential direction around the light-emitting device 501 and distributed at equal intervals so that the water mist including a shape similar to a conical shape is formed densely and uniformly.

In the exemplary embodiment in FIG. 4, the number of nozzles 401 may be four. However, the number of nozzles 401 may be adjusted depending on the circumstances. For example, the number of nozzles 401 may be three to eight.

In an exemplary embodiment of the present disclosure, the nozzles 401 are each directed vertically upward under the control of the controller 100 or inclined at a predetermined angle toward a front side of the vehicle with respect to a vertical direction thereof.

In general, the nozzle 401 is directed vertically upward so that the water mist is positioned above the housing 200.

When a vehicle window is opened and the wind is introduced into the vehicle from the outside of the vehicle, the wind may affect stability of the water mist. In the instant case, the controller 100 may be configured for controlling an actuator of the nozzle 401 so that the nozzle 401 is appropriately inclined with respect to the vertical direction, reducing a degree to which the wind introduced into the vehicle through the vehicle window affects the stability of the shape of the water mist.

When the nozzles 401 are inclined in different directions with respect to the vertical direction, the stability of the shape of the water mist may be reduced to some extent by the wind. According to a research result obtained by the applicant, the nozzle 401, which is inclined toward the front side of the vehicle, may minimize the degree to which the wind introduced into the vehicle through the vehicle window affects the stability of the shape of the water mist.

Figure 6:
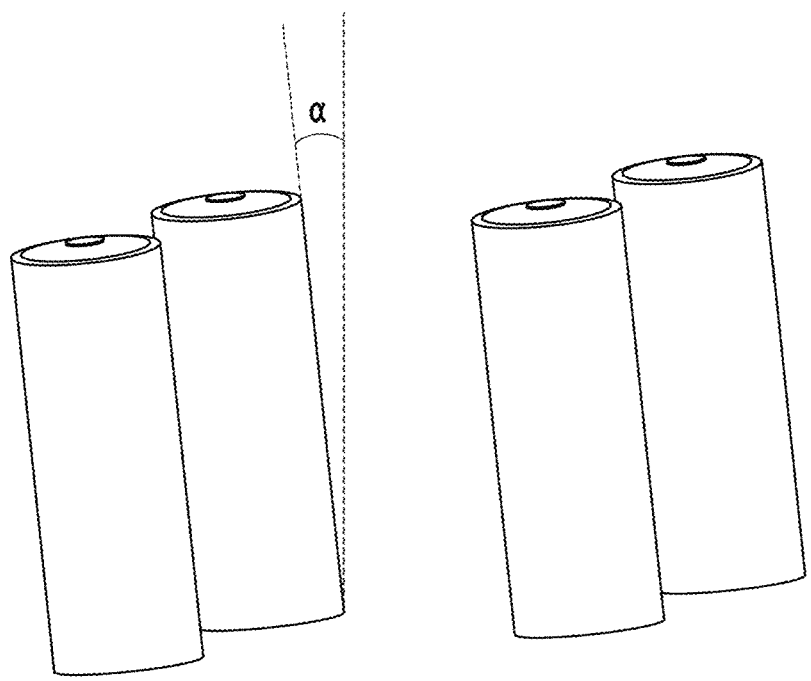
FIG. 6 is a schematic view exemplarily illustrating an inclined nozzle.

In an exemplary embodiment of the present disclosure, with reference to FIG. 6, a range of a predetermined angle α at which the nozzle 401 is inclined forward with respect to the vertical direction is 0 to 10 degrees (i.e., a range of an angle between the nozzle 401 and a horizontal surface is 80 to 90 degrees).

A knob may be mounted on the sprayer 400. The user may rotate the knob to adjust an amount of the water mist sprayed from the nozzle.

An injection amount of the water mist may be adjusted to form a conical space including a height of about 30 cm above the housing 200. A distance between a bottom portion of the conical space and an upper surface of the housing 200 may be 5 cm.

Additionally, the controller 100 may also control an actuator electrically connected to the controller 100 to raise a vehicle window glass to a predetermined height, reducing the amount of the wind introduced into the vehicle.

Figure 7:
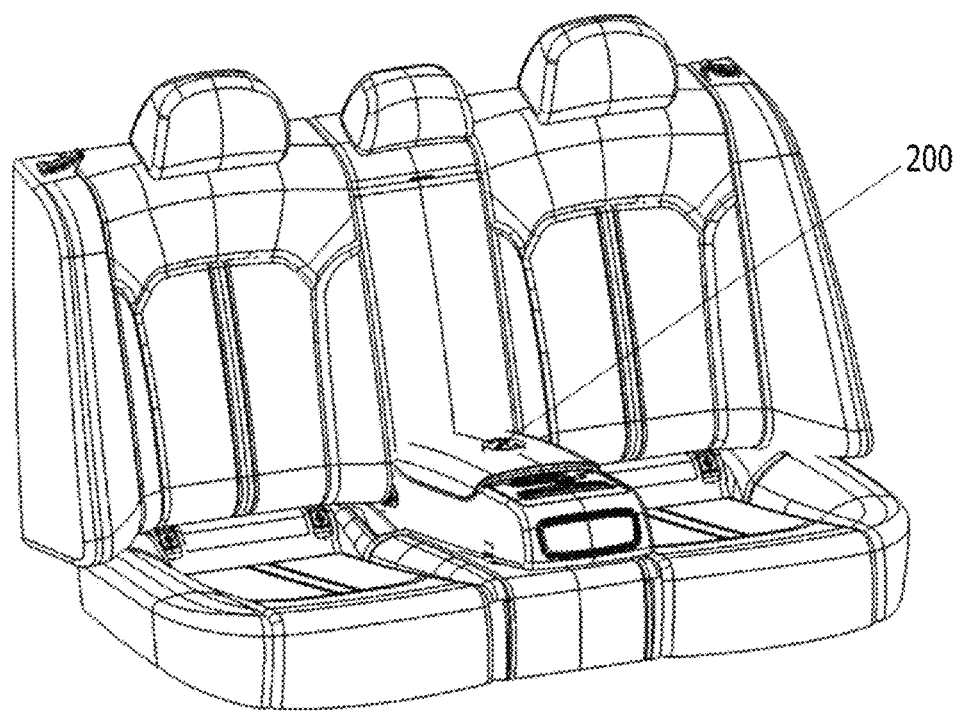
FIG. 7 is a schematic view of a hologram projection system for a vehicle mounted on a rear seat portion according to an exemplary embodiment of the present disclosure.

The housing 200 and the casing 300 may not only be mounted between the driver seat and the passenger seat, but also be mounted at a center portion of a rear seat (see FIG. 7).

In the exemplary embodiment in FIG. 1, the vehicle windows include a left front vehicle window (i.e., the vehicle window corresponding to the driver seat) and a right front vehicle window (i.e., the vehicle window corresponding to the passenger seat). In the exemplary embodiment in FIG. 7, the vehicle windows include a left rear vehicle window and a right rear vehicle window.

Figure 8:
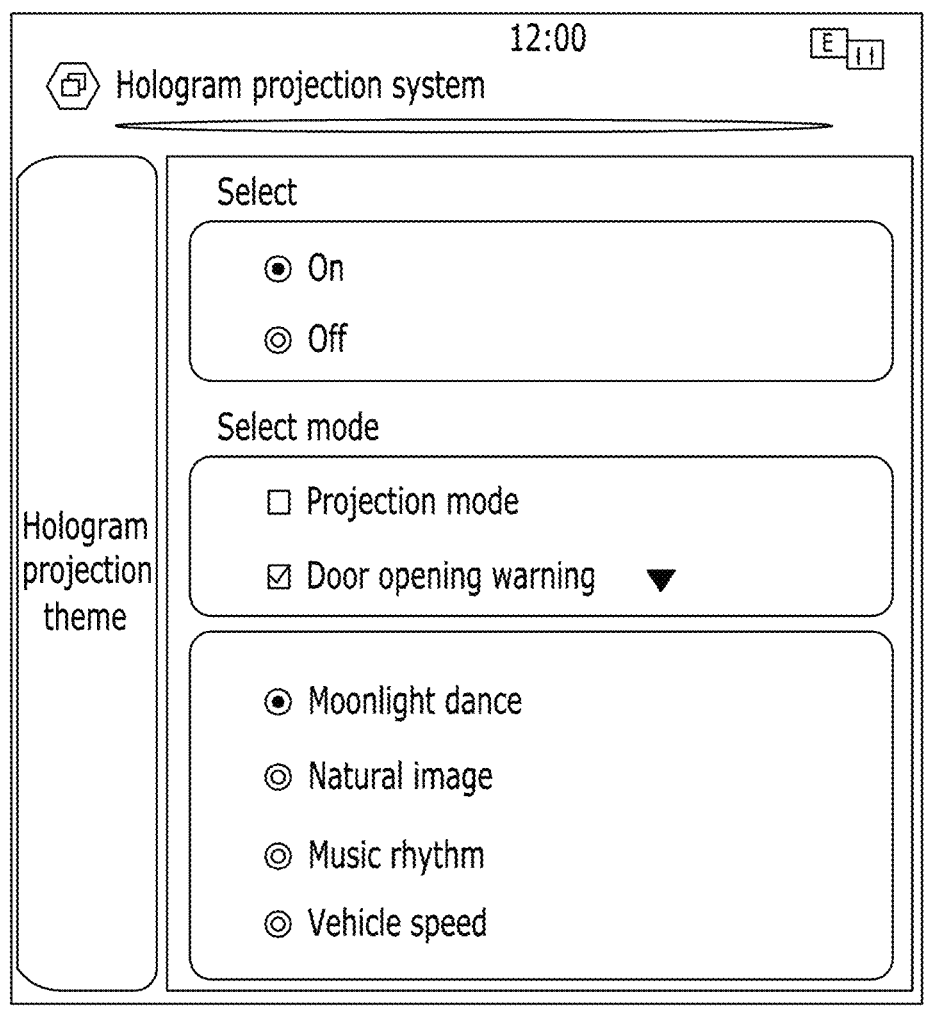
FIG. 8 is a schematic view exemplarily illustrating a display screen window.

In an exemplary embodiment of the present disclosure, with reference to FIG. 8, the hologram projection system may further include a display screen 800 electrically connected to the controller 100. The display screen 800 displays different projection modes so that the user may select one of the different projection modes. The display screen 800 receives the projection mode selected by the user and then transmits the projection mode, which is selected by the user, to the controller 100.

In an exemplary embodiment of the present disclosure, the controller 100 obtains operating states of the hologram projection device 500 and the sprayer 400. In response to the operations of the hologram projection device 500 and the sprayer 400, the controller 100 is configured to obtain a hologram projection theme selected by the user and transmit a first instruction based on the hologram projection theme selected by the user, to the hologram projection device 500. The first instruction is provided to control the hologram projection device 500 to project the different beams to the water mist and form the pattern corresponding to the selected hologram projection theme in the water mist.

In an exemplary embodiment of the present disclosure, as illustrated in FIG. 8, the hologram projection theme includes a music rhythm, a moonlight dance, a natural image, and a vehicle speed.

When the user selects a hologram projection theme of the music rhythm, the controller 100 is configured to control a speaker of the vehicle to play a music and is configured to control the hologram projection device 500 to form rhythmical beams, forming dynamic lines in the water mist 700 in accordance with the music played from the speaker (the hologram projection theme is not illustrated in the drawings).

Figure 9:
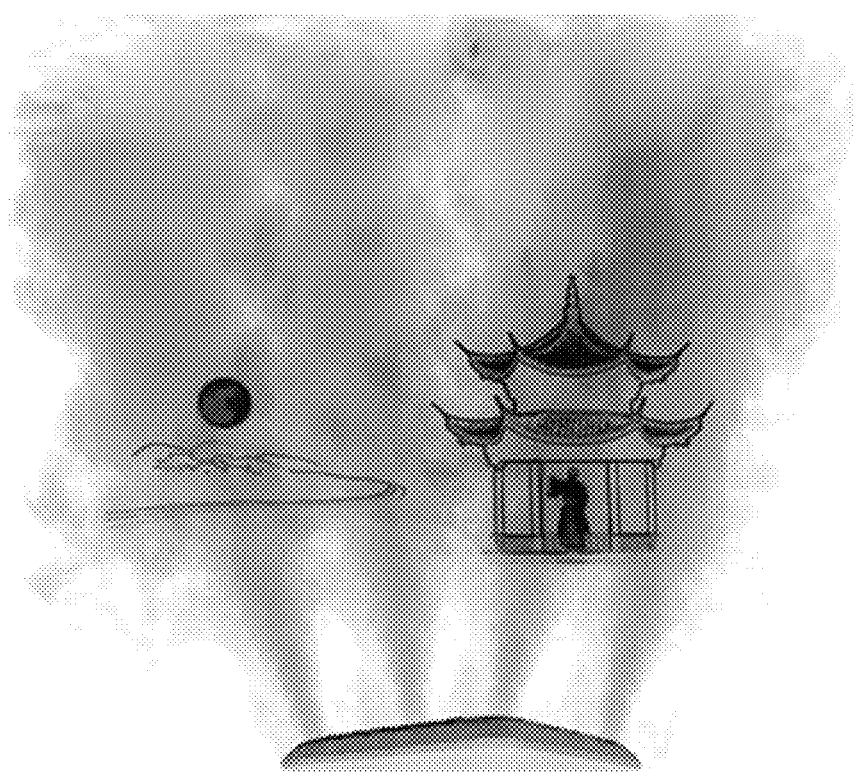
FIG. 9 is a schematic view exemplarily illustrating a pattern of a moonlight dance formed by an exemplary embodiment of the present disclosure.

When the user selects a hologram projection theme of the moonlight dance, the controller 100 is configured to control the hologram projection device 500 to form the corresponding beams, forming a pattern of the moonlight dance in the water mist 700 (see FIG. 9).

Figure 10:
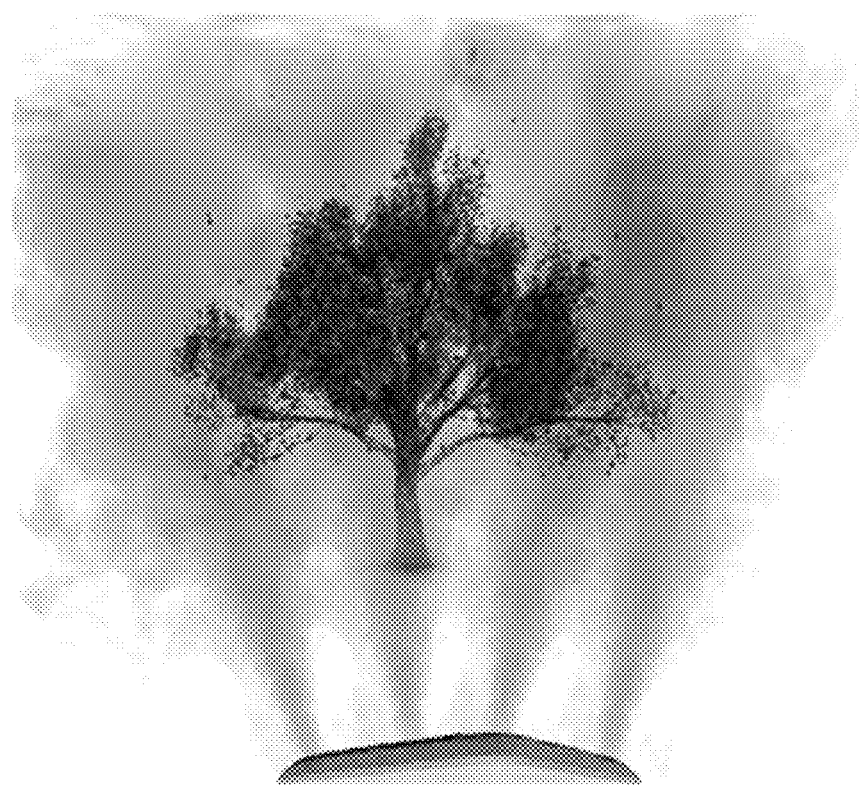
FIG. 10 is a schematic view exemplarily illustrating a pattern of a natural image formed by an exemplary embodiment of the present disclosure.

When the user selects a hologram projection theme of the natural image, the controller 100 is configured to control the hologram projection device 500 to form the corresponding beams, forming a pattern of the natural image in the water mist 700 (see FIG. 10).

Figure 11:
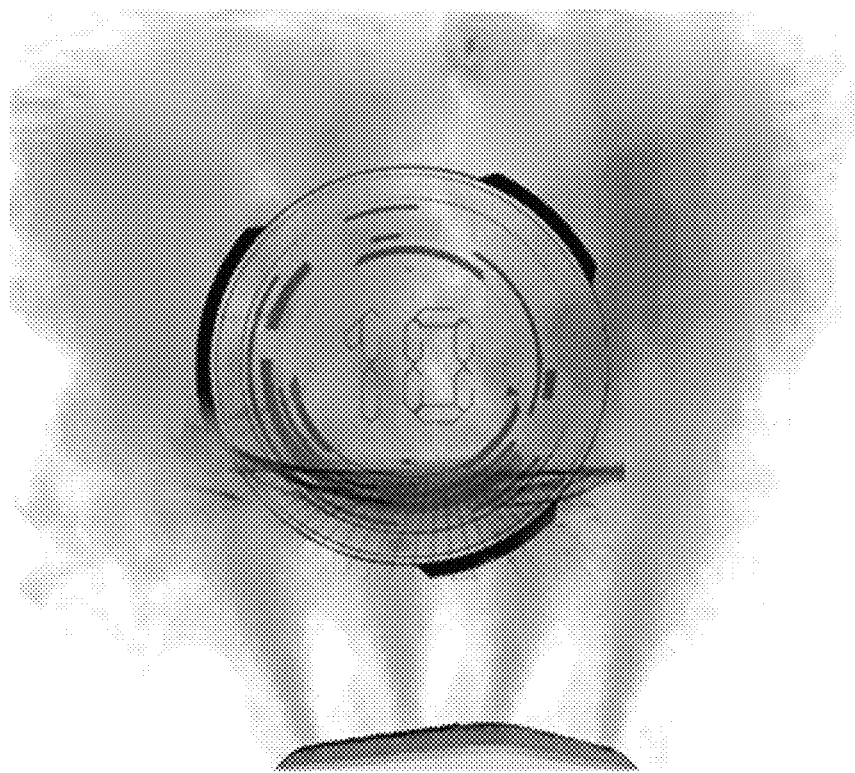
FIG. 11 is a schematic view exemplarily illustrating a pattern of a vehicle speed formed by an exemplary embodiment of the present disclosure.

When the user selects a hologram projection theme of the vehicle speed, the controller 100 is configured to control the hologram projection device 500 to form the corresponding beams, forming a pattern of the vehicle speed in the water mist 700 (see FIG. 11).

In an exemplary embodiment of the present disclosure, the controller 100 is further configured to obtain a ratio between a height of an opening defined above the glass and a height of the vehicle window and transmit a second instruction to an actuator of the glass of the vehicle window in response to a condition in which the ratio exceeds a predetermined critical value. The second instruction is provided to control and raise the glass of the vehicle window until the ratio becomes equal to the predetermined critical value and to control the nozzle 401 of the sprayer 400 so that the nozzle 401 is inclined toward the front side of the vehicle.

In an exemplary embodiment of the present disclosure, the controller 100 is further configured to determine an operating mode of an air conditioner 900 of the vehicle and transmit a third instruction to the air conditioner in response to a condition in which the air conditioner is in a face direction blowing mode. The third instruction is provided to the air conditioner to control the air conditioner to switch the mode to a foot direction blowing mode to prevent the wind from the air conditioner in the face direction blowing mode from affecting the shape of the water mist.

In an exemplary embodiment of the present disclosure, the controller 100 is further configured to obtain a vehicle speed, a parking brake state, and a door lock state in response to a condition in which a door opening warning mode is selected. The controller 100 is configured to transmit a fourth instruction in response to a condition in which a vehicle speed is 0, a parking brake is in a parking state, and a door lock is a released state. The fourth instruction is provided to the hologram projection device 500 to control the hologram projection device 500 to project warning beams to the water mist. The warning beams projected to the water mist warns drivers and passengers to pay attention to passing vehicles and pedestrians.

Figure 12:
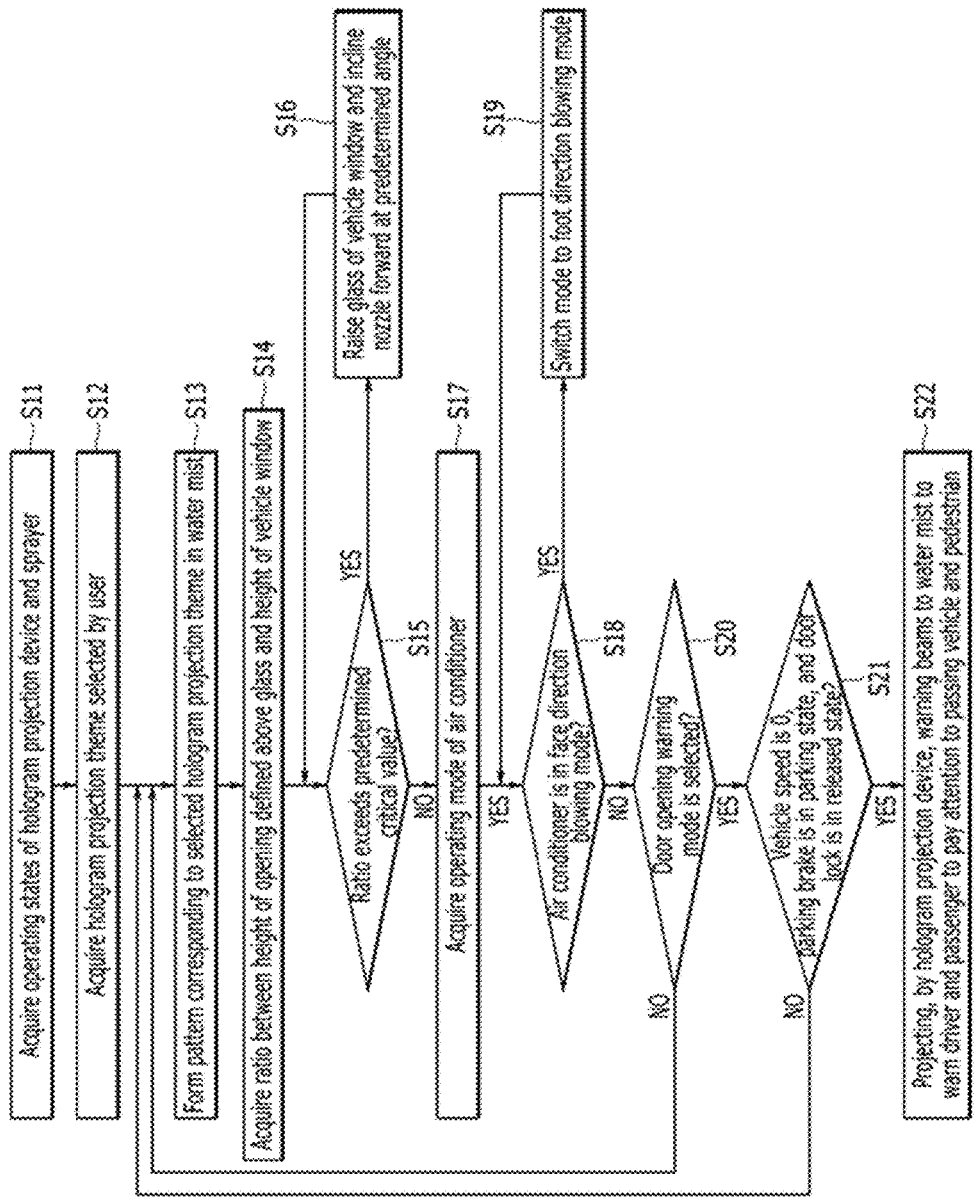
FIG. 12 is a flowchart of a method of controlling a hologram projection system for a vehicle of an exemplary embodiment of the present disclosure.

FIG. 12 is a flowchart of a method of controlling a hologram projection system for a vehicle of an exemplary embodiment of the present disclosure.

In step S11, the controller 100 obtains the operating states of the hologram projection device 500 and the sprayer 400.

In step S12, the controller 100 obtains the hologram projection theme selected by the user in response to the operations of the hologram projection device 500 and the sprayer 400.

In step S13, the controller 100 transmits the first instruction in accordance with the hologram projection theme selected by the user. The first instruction is provided to control the hologram projection device 500 to project the different beams to the water mist and form the pattern corresponding to the selected hologram projection theme in the water mist.

In step S14, the controller 100 obtains the ratio between the height of the opening defined above the glass and the height of the vehicle window.

In step S15, the controller 100 is configured to determine whether the ratio between the height of the opening defined above the glass and the height of the vehicle window exceeds the predetermined critical value.

The controller 100 transmits the second instruction in step S16 when the result in the step S15 indicates that the ratio exceeds the critical value. The second instruction is provided to control and raise the glass of the vehicle window until the ratio becomes equal to the predetermined critical value and to control the nozzle 401 so that the nozzle 401 is inclined toward the front side of the vehicle at a predetermined angle.

The controller 100 is configured to determine the operating mode of the air conditioner in step S17 when the result in the step S15 indicates that the ratio is equal to or smaller than the predetermined critical value.

In step S18, the controller 100 is configured to determine whether the operating mode of the air conditioner is the face direction blowing mode.

The controller 100 transmits the third instruction in step S19 when the result in the step S18 indicates that the operating mode of the air conditioner is the face direction blowing mode. The third instruction is provided to the air conditioner to control the air conditioner to switch the mode to the foot direction blowing mode.

The controller 100 is configured to determine whether the door opening warning mode is selected in step S20 when the result in the step S18 indicates that operating mode of the air conditioner is not the face direction blowing mode.

When the result in the step S20 indicates that the door opening warning mode is not selected, the method goes back to the step S13, and the controller 100 continues to control the hologram projection device 500 to project the beams to the water mist, forming the pattern in the water mist.

When the result in the step S20 indicates that the door opening warning mode is selected, the controller 100, in step S21, is configured to determine whether the vehicle speed is 0, whether the parking brake is in the parking state, and whether the door lock is in the released state.

When the result in the step S21 indicates that the vehicle speed is 0, the parking brake is in the parking state, and the door lock is in the released state, the controller 100 transmits the fourth instruction in step S22. The fourth instruction is provided to control the hologram projection device 500 to project warning beams to the water mist. The warning beams projected to the water mist warns the drivers and the passengers to pay attention to the passing vehicles and pedestrians.

When the result in the step S21 indicates that the vehicle speed is not 0, the parking brake is not in the parking state, or the door lock is in a locking state, the method goes back to the step S13, and the controller 100 continues to control the hologram projection device 500 to project the beams to the water mist, forming the pattern in the water mist.

The exemplary embodiment of the present disclosure further provides the vehicle including the above-mentioned hologram projection system for a vehicle.

Hereinafter, an operation of the hologram projection system for a vehicle of an exemplary embodiment of the present disclosure will be described with reference to the drawings.

The user opens the sprayer 400 by the control switch 402, and the sprayer 400 is configured to perform the spray operation to form the water mist above the housing 200 under the control of the controller 100.

The user turns on the hologram projection system on the display screen 800 and selects the hologram projection theme. Accordingly, the hologram projection device 500 generates the beams corresponding to the selected hologram projection theme and projects the beams to the water mist, forming the pattern corresponding to the hologram projection theme in the water mist.

Furthermore, when the ratio between the height of the opening defined above the glass and the height of the vehicle window exceeds the predetermined critical value, the controller 100 is configured to control and raises the glass of the vehicle window until the ratio becomes equal to the predetermined critical value, and the controller 100 is configured to control the nozzle 401 of the sprayer 400 so that the nozzle 401 is inclined toward the front side of the vehicle.

In case that the air conditioner is in the face direction blowing mode, the controller 100 is configured to control the air conditioner to switch the mode to the foot direction blowing mode.

In case that the user selects the door opening warning mode, the controller 100 obtains the vehicle speed, the parking brake state, and the door lock state.

In case that the vehicle speed is 0, the parking brake is in the parking state, and the door lock is in the released state, the controller 100 is configured to control the hologram projection device 500 to project the warning beams to the water mist. The warning beams projected to the water mist warns the drivers and the passengers to pay attention to the passing vehicles and pedestrians.

In case that the vehicle speed is not 0, the parking brake is not in the parking state, or the door lock is in the locking state, the hologram projection device 500 continues to project the beams, which correspond to the previous hologram projection theme, to the water mist.

To better interpret and accurately define the appended claims, and the terms "upper", "lower", "inner", "outer", "upper surface", "lower surface", "upper side", "lower side", "upward", "downward", "front", "rear", "back", "inner side", "external side", "inward", "outward", "inner portion", "external portion", "inner", "outer", "forward", and "rearward" are intended to explain the features of the exemplary embodiment with reference to the positions of the features illustrated in the drawings.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hologram projection system for a vehicle, the hologram projection system comprising:
    a controller;
    a housing including a plurality of through-holes formed in an upper surface of the housing;
    a casing storing water and connected to the housing;
    a sprayer mounted in the housing and fluidly connected to the casing, and including a plurality of nozzles protruding through the through-holes in the upper surface of the housing, wherein the sprayer is electrically connected to the controller, configured to spray water in the casing as water mist by performing a spray operation under a control of the controller, and configured to spray the water mist toward a location above the housing through the nozzles; and
    a hologram projection device provided in the housing, electrically connected to the controller, and including a light-emitting device mounted on the upper surface of the housing,
    wherein the hologram projection device is configured to generate different beams under control of the controller and to form different patterns by projecting the different beams to the water mist formed above the housing by the light-emitting device.

2. The hologram projection system of claim 1, wherein the plurality of nozzles of the sprayer is provided in a circumferential direction around the light-emitting device.

3. The hologram projection system of claim 1, wherein the nozzles are each directed upward in a vertical direction or inclined at a predetermined angle with respect to the vertical direction control of the controller.

4. The hologram projection system of claim 3, wherein the nozzles are each inclined at the predetermined angle toward a front side of the vehicle with respect to the vertical direction, and a range of the predetermined angle is 0 to 10 degrees.

5. The hologram projection system of claim 1, wherein the controller is configured to incline the nozzles by the predetermined angle in response that a vehicle window is opened.

6. The hologram projection system of claim 1,
    wherein the controller is further configured to:
        obtain operating states of the hologram projection device and the sprayer;
        obtain a hologram projection theme selected by a user in response to operations of the hologram projection device and the sprayer; and
        transmit a first instruction to the hologram projection device in accordance with the hologram projection theme selected by the user, and
    wherein the first instruction is provided to control the hologram projection device to project the different beams to the water mist and form a pattern corresponding to the selected hologram projection theme in the water mist among the different patterns.

7. The hologram projection system of claim 6, wherein the hologram projection theme includes at least one of a music rhythm, a moonlight dance, a natural image, and a vehicle speed.

8. The hologram projection system of claim 6,
    wherein the controller is further configured to:
        obtain a ratio between a height of an opening defined above a glass and a height of a vehicle window; and
        transmit a second instruction to an actuator of the glass, in response to the ratio exceeding a predetermined value, and
    wherein the second instruction is provided to control and raise the glass of the vehicle window until the ratio becomes equal to the predetermined value and to control the nozzles of the sprayer so that at least one nozzle of the nozzles is inclined toward a front side of the vehicle.

9. The hologram projection system of claim 6,
    wherein the controller is further configured to:
        obtain an operating mode of an air conditioner of the vehicle; and
        transmit a third instruction to the air conditioner in response to the air conditioner being in a face direction blowing mode, and
    wherein the third instruction is provided to the air conditioner to control the air conditioner to switch a mode to a foot direction blowing mode of the air conditioner.

10. The hologram projection system of claim 6,
    wherein the controller is further configured to:
        obtain a vehicle speed, a state of a parking brake, and a state of a door lock in response to a door opening warning mode being selected; and
        transmit a fourth instruction to the hologram projection device in response to the vehicle speed being 0, the parking brake being in a parking state, and the door lock being in a released state, and
    wherein the fourth instruction is provided to control the hologram projection device to project warning beams to the water mist.

11. A vehicle including the hologram projection system of claim 1.

12. A method of controlling a hologram projection system for a vehicle, the hologram projection system including a controller, a housing including a plurality of through-holes formed in an upper surface of the housing, a casing storing water and connected to the housing, a sprayer mounted in the housing and fluidly connected to the casing and including a plurality of nozzles protruding through the through-holes in the upper surface of the housing, and a hologram projection device provided in the housing, electrically connected to the controller, and including a light-emitting device mounted on the upper surface of the housing, the method comprising:

controlling, by the controller, the sprayer and the light-emitting device of the hologram projection device to generate different beams and to form different patterns by projecting the different beams to water mist formed above the housing by the sprayer spraying water as the water mist.

13. The method of claim 12, wherein the controller is further configured to control a position of the nozzles to a vertical direction or at a predetermined angle with respect to the vertical direction.

14. The method of claim 12, wherein the controller is further configured to incline the nozzles by the predetermined angle, in response that a vehicle window is opened.

15. The method of claim 12,
wherein the controller is further configured to:
obtain operating states of the hologram projection device and the sprayer;
obtain a hologram projection theme selected by a user in response to operations of the hologram projection device and the sprayer; and
transmit a first instruction to the hologram projection device in accordance with the hologram projection theme selected by the user, and
wherein the first instruction is provided to control the hologram projection device to project the different beams to the water mist and form a pattern corresponding to the selected hologram projection theme in the water mist among the different patterns.

16. The method of claim 15, wherein the hologram projection theme includes at least one of a music rhythm, a moonlight dance, a natural image, and a vehicle speed.

17. The method of claim 15,
wherein the controller is further configured to:
obtain a ratio between a height of an opening defined above a glass and a height of a vehicle window; and
transmit a second instruction to an actuator of the glass in response to the ratio exceeding a predetermined value, and
wherein the second instruction is provided to control and raise the glass of the vehicle window until the ratio becomes equal to the predetermined value and to control the nozzles of the sprayer so that at least one nozzle of the nozzles is inclined toward a front side of the vehicle.

18. The method of claim 15,
wherein the controller is further configured to:
obtain an operating mode of an air conditioner of the vehicle; and
transmit a third instruction to the air conditioner in response to the air conditioner being in a face direction blowing mode, and
wherein the third instruction is provided to the air conditioner to control the air conditioner to switch a mode to a foot direction blowing mode of the air conditioner.

19. The method of claim 15,
wherein the controller is further configured to:
obtain a vehicle speed, a state of a parking brake, and a state of a door lock in response to a door opening warning mode being selected; and
transmit a fourth instruction to the hologram projection device in response to the vehicle speed being 0, the parking brake being in a parking state, and the door lock being in a released state, and
wherein the fourth instruction is provided to control the hologram projection device to project warning beams to the water mist.

* * * * *